US012638589B2

(12) United States Patent
Baeg et al.

(10) Patent No.: US 12,638,589 B2
(45) Date of Patent: May 26, 2026

(54) VEHICLE CONTROL APPARATUS AND METHOD THEREOF

(71) Applicants: Hyundai Motor Company, Seoul (KR); Kia Corporation, Seoul (KR)

(72) Inventors: Ju Heon Baeg, Seoul (KR); Mi Rim Noh, Jeonju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 102 days.

(21) Appl. No.: 18/631,544

(22) Filed: Apr. 10, 2024

(65) Prior Publication Data

US 2025/0155579 A1 May 15, 2025

(30) Foreign Application Priority Data

Nov. 10, 2023 (KR) ......................... 10-2023-0155741

(51) Int. Cl.
G01S 17/89 (2020.01)
(52) U.S. Cl.
CPC .................................... G01S 17/89 (2013.01)
(58) Field of Classification Search
CPC ...... G01S 7/4802; G01S 7/4876; G01S 7/493; G01S 17/89; G01S 17/931
See application file for complete search history.

(56) References Cited

U.S. PATENT DOCUMENTS

| | | | |
|---|---|---|---|
| 11,423,546 B2 | 8/2022 | Noh et al. | |
| 2021/0312633 A1 | 10/2021 | Noh et al. | |
| 2022/0189040 A1 | 6/2022 | Baeg et al. | |
| 2023/0195840 A1* | 6/2023 | Hasfura | ................. G01S 17/00 |
| | | | 382/100 |
| 2023/0351679 A1* | 11/2023 | Serafin | ................... G06T 17/00 |

FOREIGN PATENT DOCUMENTS

| | | |
|---|---|---|
| KR | 20210124789 A | 10/2021 |
| KR | 20220083232 A | 6/2022 |

* cited by examiner

*Primary Examiner* — Erin D Bishop
*Assistant Examiner* — Alex B Griffin
(74) *Attorney, Agent, or Firm* — Slater Matsil, LLP

(57) ABSTRACT

A vehicle control apparatus may include a light detection and ranging device (LiDAR) and a processor. According to a method, the processor may obtain a plurality of LiDAR data points by removing points with a specific height or higher from a point cloud corresponding to an external vehicle, may generate a bounding box based on contour points, which indicate a periphery of the external vehicle, and may obtain a final bounding box obtained by correcting the bounding box based on an angle between a first heading direction of a virtual box and a second heading direction of the bounding box exceeding a reference angle, and based on a distance between a first location of the virtual box and a second location of the bounding box being smaller than or equal to a first reference distance.

20 Claims, 14 Drawing Sheets

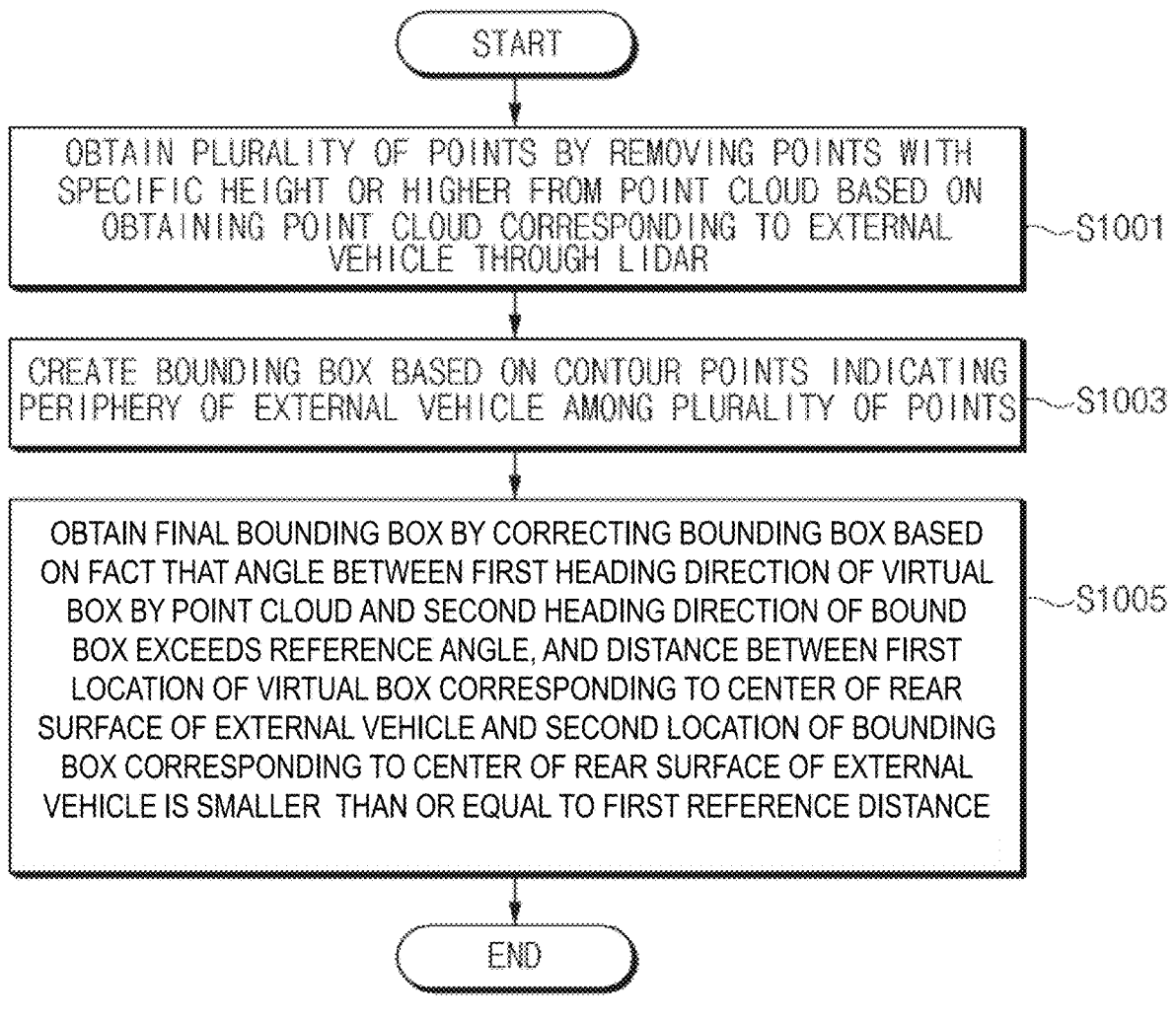

START

OBTAIN PLURALITY OF POINTS BY REMOVING POINTS WITH SPECIFIC HEIGHT OR HIGHER FROM POINT CLOUD BASED ON OBTAINING POINT CLOUD CORRESPONDING TO EXTERNAL VEHICLE THROUGH LIDAR ~S1001

CREATE BOUNDING BOX BASED ON CONTOUR POINTS INDICATING PERIPHERY OF EXTERNAL VEHICLE AMONG PLURALITY OF POINTS ~S1003

OBTAIN FINAL BOUNDING BOX BY CORRECTING BOUNDING BOX BASED ON FACT THAT ANGLE BETWEEN FIRST HEADING DIRECTION OF VIRTUAL BOX BY POINT CLOUD AND SECOND HEADING DIRECTION OF BOUND BOX EXCEEDS REFERENCE ANGLE, AND DISTANCE BETWEEN FIRST LOCATION OF VIRTUAL BOX CORRESPONDING TO CENTER OF REAR SURFACE OF EXTERNAL VEHICLE AND SECOND LOCATION OF BOUNDING BOX CORRESPONDING TO CENTER OF REAR SURFACE OF EXTERNAL VEHICLE IS SMALLER THAN OR EQUAL TO FIRST REFERENCE DISTANCE ~S1005

END

FIG.10

VEHICLE CONTROL APPARATUS AND METHOD THEREOF

CROSS-REFERENCE TO RELATED APPLICATIONS

This application claims the benefit of Korean Patent Application No. 10-2023-0155741, filed on Nov. 10, 2023, which application is hereby incorporated herein by reference.

TECHNICAL FIELD

The present disclosure relates to a vehicle apparatus, and a method thereof, for identifying an external object using light detection and ranging (LiDAR).

BACKGROUND

Various studies are being conducted to identify an external object by using various sensors to assist the driving of a vehicle.

In particular, while the vehicle is driving in a driving assistance device activation mode or an autonomous driving mode, the external object may be identified by using a LiDAR.

If an external vehicle is identified by using the LiDAR, a virtual box may be generated to include the external vehicle and a side mirror of the external vehicle, and a heading direction of the virtual box may be identified by using the virtual box including the side mirror. If the heading direction of the virtual box is identified by using the virtual box including the side mirror, the heading direction of the virtual box is incorrectly identified due to the side mirror, and thus it may be identified that the external vehicle mapping the virtual box cuts in.

If it is identified that the external vehicle mapping the virtual box cuts in, the driving route of a vehicle may be changed, or a speed of the vehicle may be reduced. To correct errors in a vehicle control system including a vehicle control apparatus, the driving route of the vehicle may be changed, or the speed of the vehicle may be reduced.

SUMMARY

The present disclosure relates to an apparatus for controlling a vehicle and a method thereof, and more specifically, relates to a technology for identifying an external object by using light detection and ranging (LiDAR).

Some embodiments of the present disclosure can solve the above-mentioned problems occurring in the prior art while advantages achieved by the prior art can be maintained intact.

An embodiment of the present disclosure provides a vehicle control apparatus that generates a bounding box obtained by excluding a portion corresponding to a side mirror of an external vehicle, and a method thereof.

An embodiment of the present disclosure provides a vehicle control apparatus that accurately identifies a heading direction of the external vehicle by generating the bounding box obtained by excluding the portion corresponding to the side mirror of the external vehicle, and a method thereof.

An embodiment of the present disclosure provides a vehicle control apparatus that accurately identifies the type of the external vehicle by using information including the side mirror even though the bounding box obtained by excluding the portion corresponding to the side mirror of the external vehicle is generated, and a method thereof.

Technical problems to be solved by some embodiments of the present disclosure are not necessarily limited to the aforementioned problems, and some embodiment may resolve other technical problems not mentioned herein, which can be clearly understood from the following description by those skilled in the art to which the present disclosure pertains.

According to an embodiment of the present disclosure, a vehicle control apparatus may include a light detection and ranging (LiDAR) and a processor. The processor may obtain a plurality of points by removing points with a specific height or higher from a point cloud based on obtaining the point cloud corresponding to an external vehicle through the LiDAR, may generate a bounding box based on contour points, which indicate a periphery of the external vehicle, from among the plurality of points, and may obtain a final bounding box obtained by correcting the bounding box based on a fact that an angle between a first heading direction of a virtual box by the point cloud and a second heading direction of the bounding box exceeds a reference angle, and a distance between a first location of the virtual box corresponding to a center of a rear surface of the external vehicle and a second location of the bounding box corresponding to the center of the rear surface of the external vehicle is smaller than or equal to a first reference distance.

In an embodiment, the processor may remove the points with the specific height or higher from the point cloud corresponding to the external vehicle based on a distance between a vehicle and the external vehicle being smaller than or equal to a second reference distance.

In an embodiment, the specific height may include a first specific height and a second specific height exceeding the first specific height. The processor may identify a length of the point cloud in a direction of a first axis among the first axis, a second axis, and a third axis, may remove first points, which are identified at the first specific height or higher in a direction of the third axis, based on the length of the point cloud being within a first range, and may remove second points, which are identified at the second specific height or higher in a direction of the third axis, based on the length of the point cloud being within a second range greater than the first range.

In an embodiment, the processor may identify the contour points on each of a plurality of layers formed in a direction of a third axis among a first axis, a second axis, and the third axis, and may generate the bounding box including the contour points identified on each of the plurality of layers.

In an embodiment, the processor may identify an array of the contour points based on a location at which the point cloud is identified, and may identify a first line segment of the bounding box corresponding to a side surface of the external vehicle based on the location, at which the point cloud is identified, and the array of contour points.

In an embodiment, the processor may identify a first end point and a second end point, which are not coupled with other contour points, from among the contour points, may identify a peak point located farthest from a line segment connecting the first end point and the second end point, may identify a second line segment connecting the peak point and an end point, which is included in contour points corresponding to the side surface of the external vehicle, from among the first end point and the second end point, and may identify representative points corresponding to the side surface of the external vehicle in an area different from an area between the first line segment and the second line segment.

In an embodiment, the processor may obtain a lateral location correction value of the bounding box based on a distance between the first line segment and an average of coordinate values of the representative points in a direction of a second axis among a first axis, the second axis, and a third axis and may obtain the final bounding box based on a difference between the lateral location correction value and a reference value being smaller than a threshold value.

In an embodiment, the processor may identify an intermediate representative point among the representative points, may identify a first representative point and a second representative point, which are included within a specific distance from the intermediate representative point and which are farthest spaced from the intermediate representative point, from among the representative points, may identify the second heading direction based on the first representative point and the second representative point, and may obtain the final bounding box based on a difference between the first heading direction and the second heading direction exceeding the reference angle.

In an embodiment, the processor may assign a first identifier to the virtual box by the point cloud, and may assign, to the final bounding box, a second identifier indicating that the final bounding box is generated by the virtual box to which the first identifier is assigned.

In an embodiment, the processor may identify a type of the external vehicle based on the virtual box to which the first identifier is assigned, and may track a driving route of the external vehicle based on the final bounding box to which the second identifier is assigned.

According to an embodiment of the present disclosure, a vehicle control method may include obtaining a plurality of points by removing points with a specific height or higher from a point cloud based on obtaining the point cloud corresponding to an external vehicle through a LiDAR, generating a bounding box based on contour points, which indicate a periphery of the external vehicle, from among the plurality of points, and obtaining a final bounding box obtained by correcting the bounding box based on a fact that an angle between a first heading direction of a virtual box by the point cloud and a second heading direction of the bounding box exceeds a reference angle, and a distance between a first location of the virtual box corresponding to a center of a rear surface of the external vehicle and a second location of the bounding box corresponding to the center of the rear surface of the external vehicle is smaller than or equal to a first reference distance.

According to an embodiment, the vehicle control method may further include removing the points with the specific height or higher from the point cloud corresponding to the external vehicle based on a distance between a vehicle and the external vehicle being smaller than or equal to a second reference distance.

In an embodiment, the specific height may include a first specific height and a second specific height exceeding the first specific height. The vehicle control method may further include identifying a length of the point cloud in a direction of a first axis among the first axis, a second axis, and a third axis, removing first points, which are identified at the first specific height or higher in a direction of the third axis, based on the length of the point cloud being within a first range, and removing second points, which are identified at the second specific height or higher in a direction of the third axis, based on the length of the point cloud being within a second range greater than the first range.

According to an embodiment, the vehicle control method may further include identifying the contour points on each of a plurality of layers formed in a direction of a third axis among a first axis, a second axis, and the third axis, and generating the bounding box including the contour points identified on each of the plurality of layers.

According to an embodiment, the vehicle control method may further include identifying an array of the contour points based on a location at which the point cloud is identified, and identifying a first line segment of the bounding box corresponding to a side surface of the external vehicle based on the location, at which the point cloud is identified, and the array of contour points.

According to an embodiment, the vehicle control method may further include identifying a first end point and a second end point, which are not coupled with other contour points, from among the contour points, identifying a peak point located farthest from a line segment connecting the first end point and the second end point, identifying a second line segment connecting the peak point and an end point, which is included in contour points corresponding to the side surface of the external vehicle, from among the first end point and the second end point, and identifying representative points corresponding to the side surface of the external vehicle in an area different from an area between the first line segment and the second line segment.

According to an embodiment, the vehicle control method may further include obtaining a lateral location correction value of the bounding box based on a distance between the first line segment and an average of coordinate values of the representative points in a direction of a second axis among a first axis, the second axis, and a third axis, and obtaining the final bounding box based on a difference between the lateral location correction value and a reference value being smaller than a threshold value.

According to an embodiment, the vehicle control method may further include identifying an intermediate representative point among the representative points, identifying a first representative point and a second representative point, which are included within a specific distance from the intermediate representative point and which are farthest spaced from the intermediate representative point, from among the representative points, identifying the second heading direction based on the first representative point and the second representative point, and obtaining the final bounding box based on a difference between the first heading direction and the second heading direction exceeding the reference angle.

According to an embodiment, the vehicle control method may further include assigning a first identifier to the virtual box by the point cloud, and assigning, to the final bounding box, a second identifier indicating that the final bounding box is generated by the virtual box to which the first identifier is assigned.

According to an embodiment, the vehicle control method may further include identifying a type of the external vehicle based on the virtual box to which the first identifier is assigned, and tracking a driving route of the external vehicle based on the final bounding box to which the second identifier is assigned.

BRIEF DESCRIPTION OF THE DRAWINGS

The above and other features and advantages of the present disclosure can be more apparent from the following detailed description taken in conjunction with the accompanying drawings, in which:

FIG. 10 is a diagram showing an example of a flowchart associated with a vehicle control method, according to an embodiment of the present disclosure;

DETAILED DESCRIPTION OF ILLUSTRATIVE EMBODIMENTS

Figure 1:
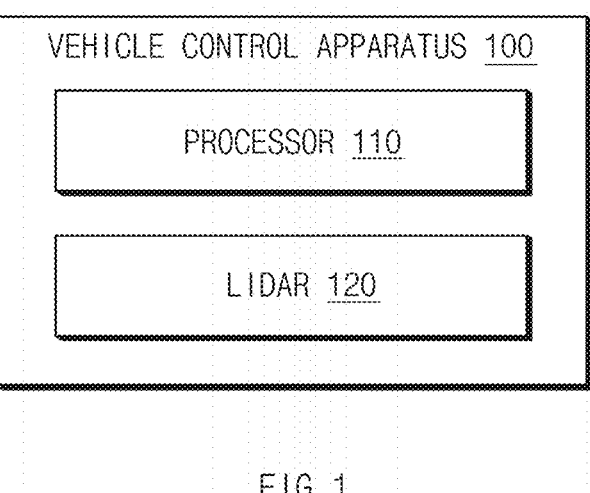
FIG. 1 shows an example of a block diagram of a vehicle control apparatus, according to an embodiment of the present disclosure.

Hereinafter, some embodiments of the present disclosure will be described in detail with reference to the accompanying drawings. By adding reference numerals to components of each drawing, it can be noted that same components include the same reference numerals, even if they are indicated on another drawing also. Furthermore, in describing some embodiments of the present disclosure, detailed descriptions associated with well-known functions or configurations can be omitted if they may make subject matters of the present disclosure unnecessarily obscure.

In describing elements of an embodiment of the present disclosure, the terms "first," "second," "A," "B," "(a)," "(b)," and the like, may be used herein. Such terms can be used merely to distinguish one element from another element, but do not necessarily limit the corresponding elements irrespective of the nature, order, or priority of the corresponding elements. Furthermore, unless otherwise defined, terms including technical and scientific terms used herein can be interpreted as is customary in the art to which the present disclosure pertains. It can be understood that terms used herein can be interpreted as including a meaning that is consistent with their meaning in the context of the present disclosure and the relevant art.

Hereinafter, various embodiments of the present disclosure will be described in detail with reference to FIGS. 1 to 12.

FIG. 1 shows an example of a block diagram of a vehicle control apparatus, according to an embodiment of the present disclosure.

Referring to FIG. 1, a vehicle control apparatus 100 according to an embodiment of the present disclosure may be implemented inside or outside a vehicle, and some of the components included in the vehicle control apparatus 100 may be implemented inside or outside the vehicle. For example, the vehicle control apparatus 100 may be integrated with internal control units of a vehicle and may be implemented with a separate device to be coupled with control units of the vehicle by a separate connection. For example, the vehicle control apparatus 100 may further include components not shown in FIG. 1.

A vehicle control apparatus 100 according to an embodiment may include a processor 110 and a LiDAR 120, either or both of which may be in plural or may include plural components thereof. The processor 110 or the LiDAR 120 may be electrically and/or operably coupled with each other by an electronic component including a communication bus.

Hereinafter, pieces of hardware being coupled operably may include a direct and/or indirect connection between the pieces of hardware by being wired and/or wirelessly connected, such that second hardware can be controlled by first hardware among the pieces of hardware.

Although different blocks are shown, an embodiment is not necessarily limited thereto. Some of the pieces of hardware in FIG. 1 may be included in a single integrated circuit including a system on a chip (SoC). The type and/or number of hardware included in the vehicle control apparatus 100 is not limited to that shown in FIG. 1. For example, the vehicle control apparatus 100 may include only some of the pieces of hardware shown in FIG. 1.

A vehicle control apparatus 100 according to an embodiment may include hardware for processing data based on one or more instructions. The hardware for processing data may include the processor 110. For example, the hardware for processing data may include an arithmetic and logic unit (ALU), a floating point unit (FPU), a field programmable gate array (FPGA), a central processing unit (CPU), and/or an application processor (AP). The processor 110 may include a structure of a single-core processor, or may include a structure of a multi-core processor including a dual core, a quad core, a hexa core, or an octa core, for example.

The LiDAR 120 included in the vehicle control apparatus 100 according to an embodiment may obtain data sets from identifying objects surrounding the vehicle control apparatus 100. For example, the LiDAR 120 may identify at least one of a location of the surrounding object, a movement direction of the surrounding object, a speed of the surrounding object, or any combination thereof, based on a pulse laser signal emitted from the LiDAR 120 being reflected by the surrounding object and returned.

For example, the LiDAR 120 may obtain data sets for expressing an external object in the space defined by a first axis, a second axis, and a third axis based on a pulse laser signal reflected from surrounding objects. For example, each of the data sets may correspond to each frame.

For example, the first axis may include an x-axis. For example, the second axis may include a y-axis. For example, the third axis may include a z-axis. For example, the first axis, the second axis, and the third axis may be perpendicular to each other and may be intersect each other based on an origin point. The first axis, the second axis, and the third axis are not limited to the above examples. Hereinafter, for convenience of description, the first axis is described as the x-axis; the second axis is described as the y-axis; and the third axis is described as the z-axis.

For example, the LiDAR 120 may obtain data sets including a plurality of points in the space, which are formed by the x-axis, the y-axis, and the z-axis, based on receiving the pulse laser signal at a specified period.

The processor 110 included in the vehicle control apparatus 100 according to an embodiment may emit light from a vehicle by using the LiDAR 120. For example, the LiDAR 120 may receive light emitted from the vehicle. For example, the processor 110 may identify at least one of a location, a speed, a moving direction, or any combination thereof, of a surrounding object based on a time required to transmit light emitted from the vehicle and/or a time required to receive light emitted from the vehicle.

For example, the processor 110 may obtain data sets including a plurality of points based on the time required to transmit light emitted from the vehicle and the time required to receive light emitted from the vehicle. The processor 110 may obtain data sets for expressing a plurality of points in a three-dimensional virtual coordinate system including the x-axis, the y-axis, and the z-axis.

In an embodiment, the processor 110 may obtain a point cloud corresponding to an external vehicle through the LiDAR 120. For example, a point cloud may be obtained by performing clustering based on each of a plurality of points obtained by the LiDAR 120 being identified at a specific distance. For example, each of the plurality of points identified at the specific distance may include a distance between the plurality of points being smaller than the specific distance.

For example, a point cloud may include a set of points for generating a virtual box that represents an external object for identifying contour points.

In an embodiment, the processor 110 may remove points with a specific height or higher from a point cloud, based on obtaining the point cloud corresponding to an external vehicle through the LiDAR 120. For example, the processor 110 may obtain the plurality of points based on removing points with a specific height or higher from the point cloud based on obtaining the point cloud through the LiDAR 120.

For example, the processor 110 may obtain the plurality of points by removing points with a specific height or higher from the point cloud based on obtaining the point cloud corresponding to the external vehicle driving on a different lane from a lane, on which a vehicle is driving, through the LiDAR 120.

In an embodiment, the processor 110 may identify the contour points indicating a periphery of the external vehicle among the plurality of points. For example, the contour points may be identified on each of layers formed based on the z-axis among the x-axis, the y-axis, and the z-axis.

For example, the contour points may be obtained based on representative points, which are included in the point cloud, on each of layers formed based on the z-axis among the x-axis, the y-axis, and the z-axis. For example, the representative points may include all and/or part of points, which are located at the outside, from among a plurality of points included in the point cloud. For example, the point cloud may be obtained by performing clustering, based on identifying that a distance between the plurality of points obtained by the LiDAR 120 is within a specific distance.

In an embodiment, the processor 110 may generate a bounding box based on contour points indicating the periphery of the external vehicle among the plurality of points. For example, the bounding box may include an external vehicle within a frame.

In an embodiment, the processor 110 may identify a first heading direction of a virtual box by the point cloud. The processor 110 may identify a second heading direction of a bounding box. The processor 110 may determine whether an angle between the first heading direction of the virtual box and the second heading direction of the bounding box by the point cloud is smaller than or equal to a reference angle.

In an embodiment, the processor 110 may identify a first location of the virtual box corresponding to a center of a rear surface of the external vehicle. The processor 110 may identify a second location of the bounding box corresponding to a center of a rear surface of the external vehicle. For example, the processor 110 may identify a distance between the first location of the virtual box corresponding to the center of the rear surface of the external vehicle and the second location of the bounding box corresponding to the center of the rear surface of the external vehicle. For example, the processor 110 may determine whether the distance between the first location and the second location is smaller than or equal to a first reference distance.

In an embodiment, the processor 110 may obtain a final bounding box obtained by correcting the bounding box based on the angle between the first heading direction of the virtual box by the point cloud and the second heading direction of the bounding box exceeding the reference angle, and the distance between the first location of the virtual box corresponding to the center of the rear surface of the external vehicle and the second location of the bounding box corresponding to the center of the rear surface of the external vehicle being smaller than or equal to the first reference distance.

In an embodiment, the processor 110 may remove points with a specific height or higher from the point cloud corresponding to the external vehicle based on the distance between the vehicle and the external vehicle being smaller than or equal to a second reference distance. For example, the processor 110 may identify a distance between a line segment corresponding to the front surface of the vehicle and a line segment corresponding to the rear surface of the external vehicle. The processor 110 may remove points with a specific height or higher from the point cloud corresponding to the external vehicle based the distance between the line segment corresponding to the front surface of the vehicle and the line segment corresponding to the rear surface of the external vehicle being smaller than or equal to the second reference distance.

For example, the points with the specific height or higher may include points corresponding to the side mirror of the external vehicle. The processor 110 may accurately identify the heading direction of the virtual box, the bounding box, and/or the final bounding box corresponding to the external vehicle by removing points corresponding to the side mirror of the external vehicle.

In an embodiment, the processor 110 may obtain the bounding box by removing points with a specific height or higher from the point cloud corresponding to the external vehicle based on the distance between the line segment corresponding to the front surface of the vehicle and the line segment corresponding to the rear surface of the external vehicle being smaller than or equal to the second reference distance.

In an embodiment, the processor 110 may identify a length of the point cloud in a direction of the first axis among the first axis, the second axis, and the third axis. For example, the first axis may include the x-axis. For example, the second axis may include the y-axis. For example, the third axis may include the z-axis.

For example, the specific height may include a first specific height and/or a second specific height. For example, the second specific height may exceed the first specific height.

In an embodiment, the processor 110 may remove first points, which are identified at the first specific height or higher in the third axis direction, based on the length of the point cloud being within a first range.

In an embodiment, the processor 110 may remove second points, which are identified at the second specific height or higher in the third axis direction, based on the length of the point cloud being within a second range greater than the first range.

For example, the length of the point cloud being within the first range may include a case that the external vehicle is a passenger vehicle. For example, the length of the point cloud being within the second range may include a case that the external vehicle is a large vehicle including at least one of a truck, a bus, or any combination thereof.

In an embodiment, the processor 110 may identify contour points on each of a plurality of layers formed by the third axis direction among the first axis, second axis, and third axis directions. The processor 110 may generate a bounding box including the contour points identified on each of a plurality of layers.

In an embodiment, the processor 110 may identify an array of contour points based on the location at which the point cloud is identified. The processor 110 may identify a first line segment of the bounding box corresponding to a side surface of the external vehicle based on a location at which the point cloud is identified, and/or the array of contour points.

In an embodiment, the processor 110 may identify a first end point and/or a second end point, which is not coupled with other contour points, from among the contour points. The processor 110 may identify a peak point located farthest from the line segment connecting the first end point and the second end point.

The processor 110 may identify a second line segment connecting the peak point and an end point, which is included in the contour points corresponding to the side surface of the external vehicle, from among the first end point and the second end point. The processor 110 may identify representative points corresponding to the side surface of the external vehicle in an area different from an area between the first line segment and the second line segment.

In an embodiment, the processor 110 may obtain the average of coordinate values of the representative points in a direction of the second axis among the first axis, the second axis, and the third axis. The processor 110 may obtain a lateral location correction value of the bounding box based on a distance between the first line segment and the average of the coordinate values of representative points in the direction of the second axis among the first axis, the second axis, and the third axis.

The processor 110 may obtain a final bounding box, which is obtained by correcting the bounding box, based on a difference between the lateral location correction value and the reference value being smaller than a threshold value.

In an embodiment, the processor 110 may identify an intermediate representative point among the representative points. The processor 110 may identify a first representative point and a second representative point, which are farthest away from the intermediate representative point, from among representative points included within a specific distance. The processor 110 may identify the second heading direction of the bounding box based on the first representative point and the second representative point. For example, the processor 110 may identify the second heading direction of the bounding box based on a direction that extends from the first representative point to the second representative point.

The processor 110 may obtain a final bounding box, which is obtained by correcting the bounding box, based on a difference between the first heading direction of the virtual box and the second heading direction of the bounding box exceeding the reference angle.

In an embodiment, the processor 110 may assign a first identifier to the virtual box by the point cloud. The processor 110 may assign, to the final bounding box, a second identifier indicating that the final bounding box is generated by the virtual box to which the first identifier is assigned.

In an embodiment, the processor 110 may identify the type of the external vehicle based on the virtual box to which the first identifier is assigned. The processor 110 may track the driving route of the external vehicle based on the final bounding box to which the second identifier is assigned.

In an embodiment, the processor 110 may output the virtual box and the final bounding box. For example, the processor 110 may output the virtual box and the final bounding box, which are generated from the point cloud corresponding to the external vehicle. For example, the processor 110 may assist in an operation of the vehicle including the vehicle control apparatus 100 based on the final bounding box and the virtual box obtained from point cloud corresponding to the external vehicle.

Figure 2:
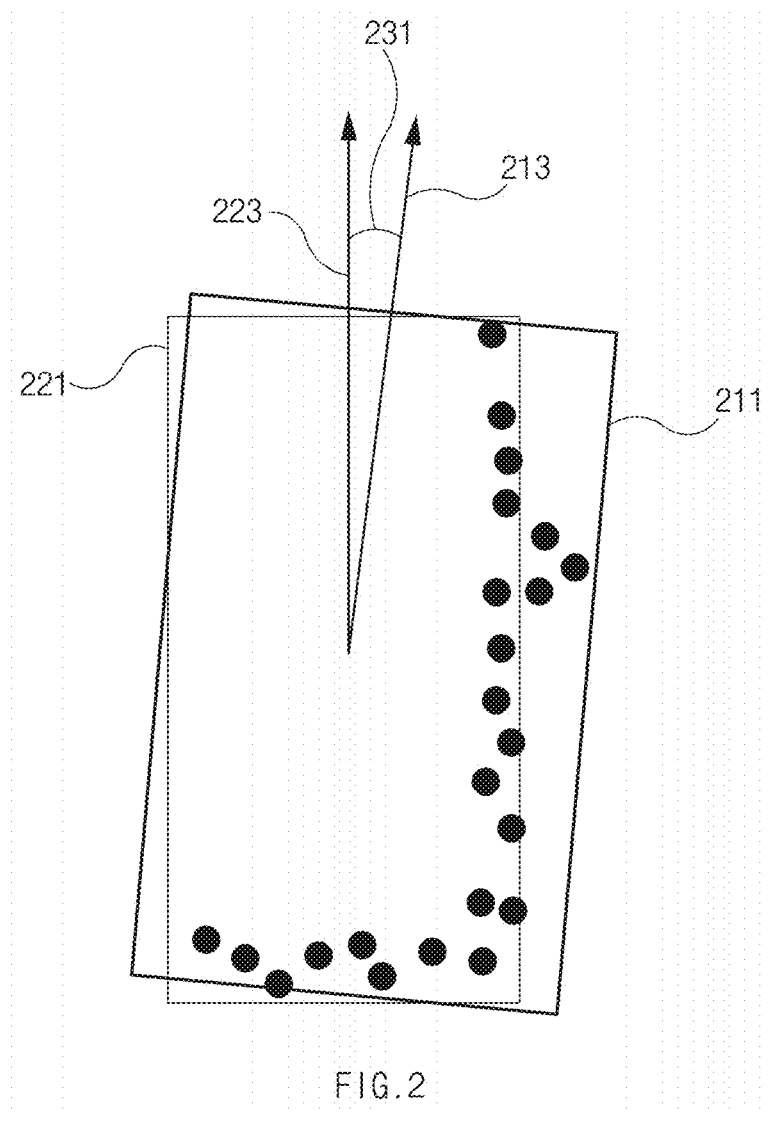
FIG. 2 is a diagram showing an example of comparing an angle between a first heading direction of a virtual box and a second heading direction of a bounding box, according to an embodiment of the present disclosure.

FIG. 2 shows an example of comparing an angle between a first heading direction of a virtual box and a second heading direction of a bounding box, according to an embodiment of the present disclosure.

Referring to FIG. 2, a processor (e.g., the processor 110 in FIG. 1) of a vehicle control apparatus (e.g., the vehicle control apparatus 100 in FIG. 1) according to an embodiment may obtain a virtual box 211 corresponding to an external vehicle through a LiDAR (e.g., the LiDAR 120 in FIG. 1). For example, the virtual box 211 may be generated based on a point cloud corresponding to the external vehicle among a plurality of points.

In an embodiment, the processor may identify a first heading direction 213 of the virtual box 211. For example, the first heading direction 213 of the virtual box 211 may be formed as a direction from a center of a rear surface of the external vehicle toward a front surface of the external vehicle.

In an embodiment, the processor may generate a bounding box 221. For example, the processor may generate the bounding box 221 based on removing points with a specific height or higher from the point cloud. The processor may identify a second heading direction 223 in the bounding box 221.

In an embodiment, the processor may identify an angle 231 between the first heading direction 213 of the virtual box

211 and the second heading direction 223 of the bounding box 221. The processor may obtain a final bounding box, which can be obtained by correcting the bounding box 221, based on the angle 231 between the first heading direction 213 of the virtual box 211 and the second heading direction 223 of the bounding box 221 exceeding a reference angle.

As described above, the processor of the vehicle control apparatus according to an embodiment may obtain the final bounding box representing the external vehicle by obtaining the final bounding box based on the angle 231 between the first heading direction 213 of the virtual box 211 and the second heading direction 223 of the bounding box 221.

Figure 3A:
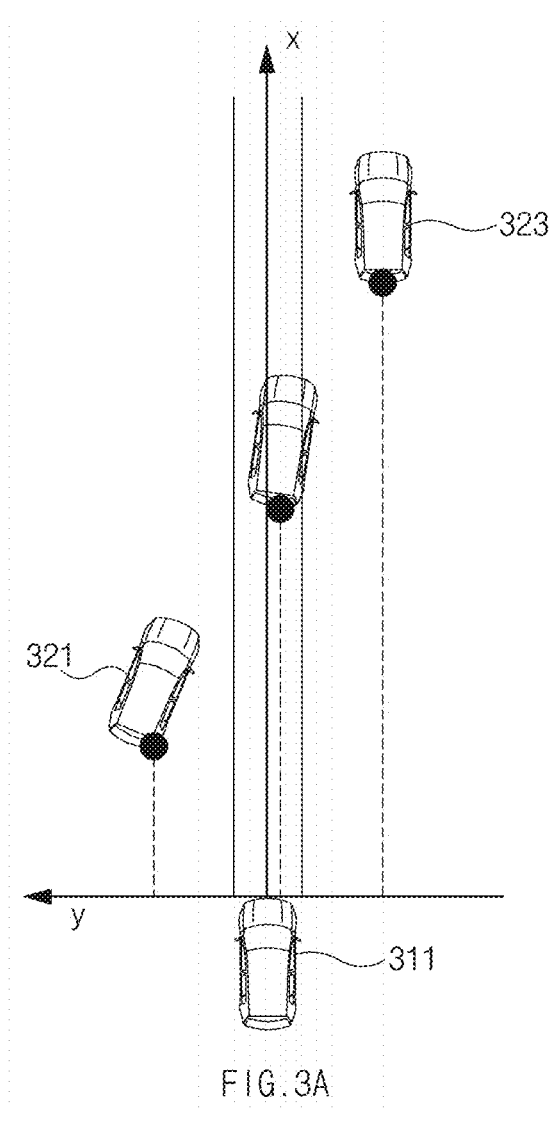
FIG. 3A is a diagram showing an example of removing points depending on a location of an external vehicle, according to an embodiment of the present disclosure.

FIG. 3A shows an example of removing points depending on a location of an external vehicle, in an embodiment of the present disclosure.

Referring to FIG. 3A, a processor (e.g., the processor 110 in FIG. 1) of a vehicle control apparatus (e.g., the vehicle control apparatus 100 in FIG. 1) according to an embodiment may identify a lateral location of an external vehicle. For example, the processor may identify the lateral location of the external vehicle based on a vehicle 311.

The processor may identify the lateral location of the external vehicle based on a point cloud corresponding to the external vehicle obtained through a LiDAR (e.g., the LiDAR 120 in FIG. 1).

For example, the processor may identify a coordinate value of the point cloud corresponding to an external vehicle 321. The processor may identify an intermediate value of a y-axis direction among coordinate values of the point cloud corresponding to the external vehicle 321. For example, the processor may perform operations of removing points corresponding to a side mirror of the external vehicle 321 based on the intermediate value of the y-axis direction among the coordinate values of the point cloud corresponding to the external vehicle 321 being smaller than a coordinate range corresponding to a road on which the vehicle 311 is driving. For example, the operations of removing points corresponding to the side mirror of the external vehicle 321 may include an operation of removing points with a specific height or higher from the point cloud corresponding to the external vehicle 321.

For example, the processor may identify a coordinate value of the point cloud corresponding to an external vehicle 323. The processor may identify an intermediate value of a y-axis direction among coordinate values of the point cloud corresponding to the external vehicle 323. For example, the processor may perform operations of removing points corresponding to a side mirror of the external vehicle 323 based on the intermediate value of the y-axis direction among the coordinate values of the point cloud corresponding to the external vehicle 323 being greater than a coordinate range corresponding to a road on which the vehicle 311 is driving. For example, the operations of removing points corresponding to the side mirror of the external vehicle 323 may include an operation of removing points with a specific height or higher from the point cloud corresponding to the external vehicle 323.

As described above, the processor of the vehicle control apparatus according to an embodiment may not perform an operation of removing points corresponding to the side mirror of the external vehicle identified on all roads and but may remove points corresponding to the side mirror of the external vehicle (e.g., the external vehicle 321 and/or the external vehicle 323) driving on a different road from a road on which the vehicle is driving, thereby reducing the load of the processor.

Figure 3B:
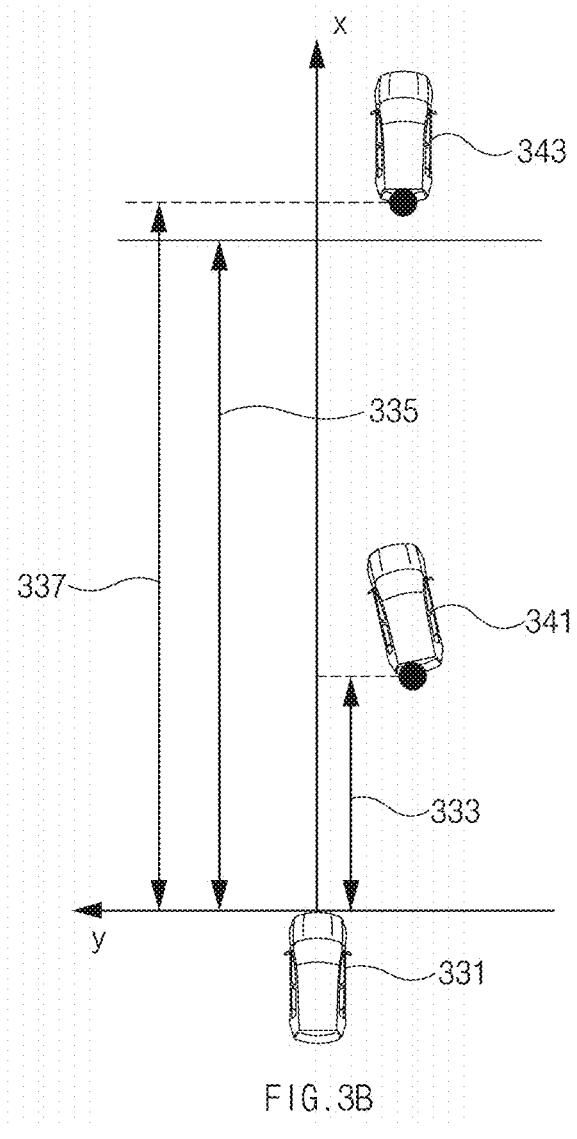
FIG. 3B is a diagram showing an example of removing points depending on a distance between a vehicle and an external vehicle, according to an embodiment of the present disclosure.

FIG. 3B shows an example of removing points depending on a distance between a vehicle and an external vehicle, in an embodiment of the present disclosure.

Referring to FIG. 3B, a processor (e.g., the processor 110 in FIG. 1) of a vehicle control apparatus (e.g., the vehicle control apparatus 100 in FIG. 1) according to an embodiment may identify a distance between a vehicle 331 and an external vehicle (e.g., an external vehicle 341 and/or an external vehicle 343) based on a plurality of points obtained through a LiDAR (e.g., the LiDAR 120 in FIG. 1).

In an embodiment, the processor may identify a line segment that includes a center of a rear surface of the external vehicle 341 and is parallel to a y-axis. The processor may identify a distance 333 between a line segment, which includes the center of the rear surface of the external vehicle 341 and is parallel to the y-axis, and a line segment corresponding to a front surface of the vehicle 331.

In an embodiment, the processor may remove points with a specific height or higher from a point cloud corresponding to the external vehicle 341 based on the distance 333 between the line segment, which includes the center of the rear surface of the external vehicle 341 and is parallel to the y-axis, and the line segment corresponding to the front surface of the vehicle 331 being smaller than or equal to a reference distance 335.

In an embodiment, the processor may identify a line segment that includes a center of a rear surface of the external vehicle 343 and is parallel to a y-axis. The processor may identify a distance 337 between a line segment, which includes the center of the rear surface of the external vehicle 343 and is parallel to the y-axis, and a line segment corresponding to a front surface of the vehicle 331.

In an embodiment, the processor may identify a line segment that includes a center of a rear surface of the external vehicle 343 and is parallel to a y-axis. The processor may generate a virtual box and/or a bounding box by using a point cloud corresponding to the external vehicle 343 based on the distance 337 between the line segment, which includes the center of the rear surface of the external vehicle 343 and is parallel to the y-axis, and the line segment corresponding to the front surface of the vehicle 331 exceeding the reference distance 335.

As mentioned above, the processor of the vehicle control apparatus according to an embodiment may remove points corresponding to the side mirror of the external vehicle based on the distance between the vehicle 331 and the external vehicle (e.g., the external vehicle 341 and/or the external vehicle 343). The processor may remove points corresponding to the side mirror of the external vehicle based on the distance between the vehicle 331 and the external vehicle (e.g., the external vehicle 341 and/or the external vehicle 343), thereby reducing the load of the processor.

Figure 3C:
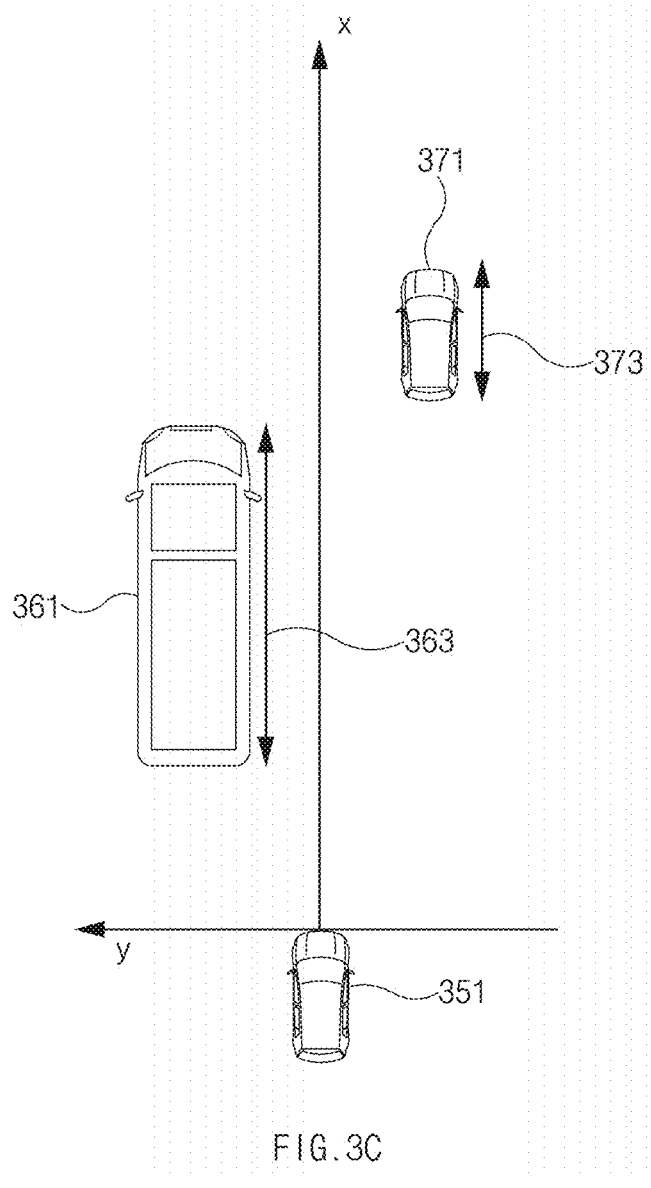
FIG. 3C is a diagram showing an example of removing points depending on a type of an external vehicle, according to an embodiment of the present disclosure.

FIG. 3C shows an example of removing points depending on a type of an external vehicle, in an embodiment of the present disclosure.

Referring to FIG. 3C, a processor (e.g., the processor 110 in FIG. 1) of a vehicle control apparatus (e.g., the vehicle control apparatus 100 in FIG. 1) according to an embodiment may identify a length of a point cloud corresponding to an external vehicle (e.g., an external vehicle 361 and/or an external vehicle 371) by using a LiDAR (e.g., the LiDAR 120 in FIG. 1). The vehicle control apparatus is included in vehicle 351.

For example, the processor may estimate the type of the external vehicle based on the length of the point cloud.

In an embodiment, the processor may identify a length 373 of the point cloud corresponding to the external vehicle 371. For example, the processor may identify the length 373 of the point cloud corresponding to the external vehicle 371 in an x-axis direction.

In an embodiment, the processor may identify that the length 373 of the point cloud corresponding to the external vehicle 371 is included in the first range. The processor may remove first points identified at a first specific height or higher from a point cloud corresponding to the external vehicle 371 based on the length 373 of the point cloud corresponding to the external vehicle 371 being included in the first range.

In an embodiment, the processor may generate a bounding box based on the point cloud from which the first points are removed.

For example, the length 373 of the point cloud being included in the first range may indicate that the type of the external vehicle 371 is of the first type including a passenger vehicle.

In an embodiment, the processor may identify a length 363 of the point cloud corresponding to the external vehicle 361. For example, the processor may identify the length 363 of the point cloud corresponding to the external vehicle 361 in an x-axis direction.

In an embodiment, the processor may identify that the length 363 of the point cloud corresponding to the external vehicle 361 is included in a second range greater than the first range. The processor may remove second points identified at a second specific height or higher exceeding the first specific height from the point cloud corresponding to the external vehicle 361 based on the length 363 of the point cloud corresponding to the external vehicle 361 being included in the second range greater than the first range.

In an embodiment, the processor may generate a bounding box based on the point cloud from which the second points are removed.

For example, the length 363 of the point cloud being included in the second range may indicate that the type of the external vehicle 361 is a second type including at least one of a truck, a bus, or any combination thereof.

As mentioned above, the processor of the vehicle control apparatus according to an embodiment may remove points with a specific height or higher based on the length of the point cloud corresponding to the external vehicle (e.g., the external vehicle 361 and/or the external vehicle 371). The processor may remove points corresponding to the side mirror of the external vehicle depending on the size of the external vehicle by removing points at a different specific height.

Figure 4:
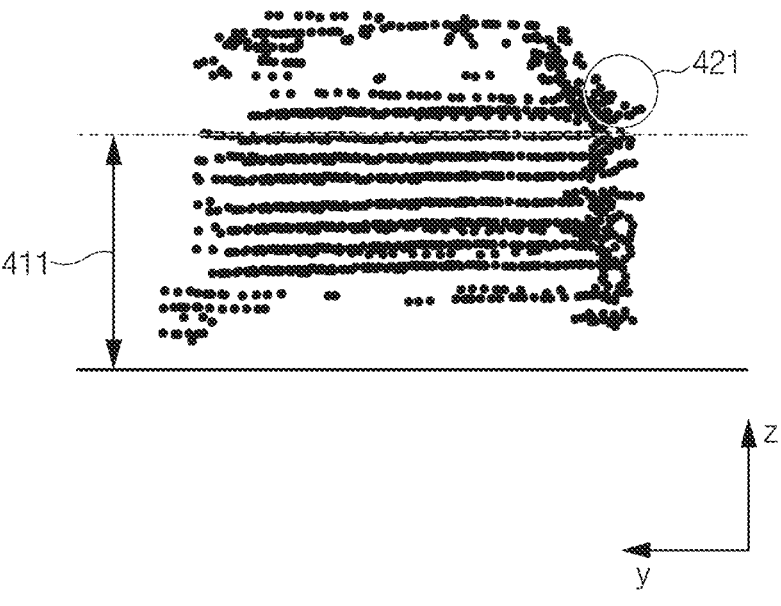
FIG. 4 is a diagram showing an example of a vehicle control apparatus that removes points with a specific height or higher, according to an embodiment of the present disclosure.

FIG. 4 shows an example of a vehicle control apparatus that removes points with a specific height or higher, in an embodiment of the present disclosure.

Referring to FIG. 4, a processor (e.g., the processor 110 in FIG. 1) of a vehicle control apparatus (e.g., the vehicle control apparatus 100 in FIG. 1) according to an embodiment may obtain a point cloud corresponding to an external vehicle. For example, the processor may obtain the point cloud corresponding to the external vehicle driving on a different road from a road on which the vehicle is driving.

In an embodiment, the processor may identify a specific height 411 of a direction of a z-axis among an x-axis, a y-axis, and the z-axis.

For example, the processor may remove points 421, which are identified at the specific height 411 or higher, based on obtaining the point cloud corresponding to the external vehicle. In the example of FIG. 4, the points 421 corresponding to a side mirror are shown, but an embodiment is not limited thereto.

For example, the processor may remove only the points 421, which correspond to a side mirror of the external vehicle, from the point cloud corresponding to the external vehicle or may remove all points identified at the specific height of 411 or higher.

An example of FIG. 4 shows a point cloud expressed on a plane formed by the y-axis and the z-axis, but an embodiment is not limited thereto. For example, the processor may remove the points 421, which are identified at the specific height 411 or higher, from among the point cloud expressed on a plane formed by the x-axis and the z-axis. For example, the processor may remove the points 421, which are identified at the specific height 411 or higher, from among the point cloud expressed in a space formed by the x-axis, the y-axis, and the z-axis.

In an embodiment, the processor may generate a bounding box based on the point cloud from which the points 421 identified at the specific height 411 or higher are removed.

As described above, the processor of the vehicle control apparatus according to an embodiment may generate a bounding box corresponding to the external vehicle by using the point cloud, from which the points 421 are removed, based on removing the points 421 identified at the specific height 411 or higher. The processor may accurately identify a location of the bounding box corresponding to the external vehicle and/or a heading direction of the bounding box by generating the bounding box based on the point cloud, from which the points 421 identified at the specific height 411 or higher are removed.

Figure 5:
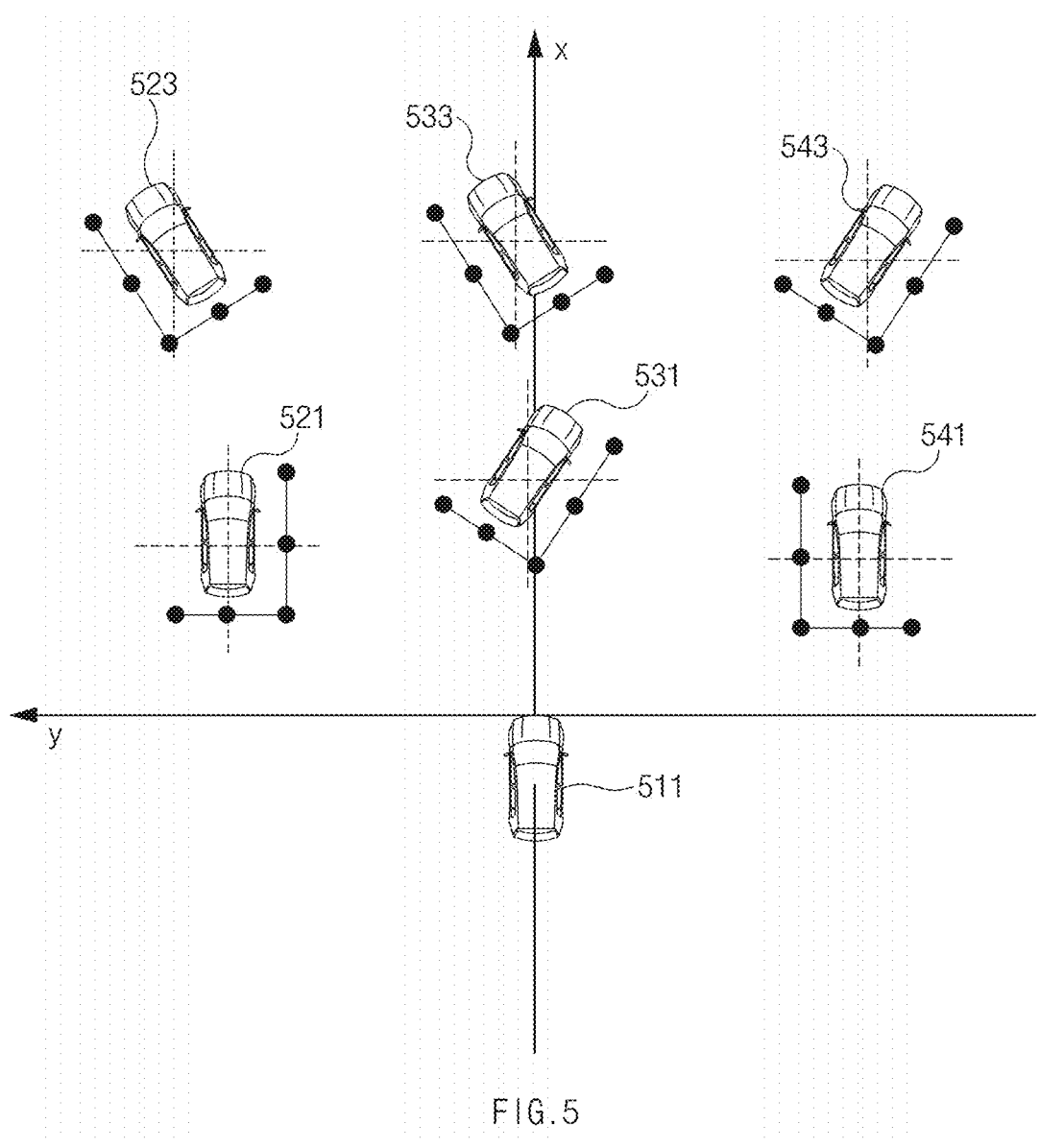
FIG. 5 is a diagram showing an example of identifying a line segment of a bounding box corresponding to a side surface of an external vehicle based on an array of contour points, according to an embodiment of the present disclosure.

FIG. 5 shows an example of identifying a line segment of a bounding box corresponding to a side surface of an external vehicle based on an array of contour points, in an embodiment of the present disclosure.

Referring to FIG. 5, a processor (e.g., the processor 110 in FIG. 1) included in a vehicle control apparatus (e.g., the vehicle control apparatus 100 in FIG. 1) according to an embodiment may identify a location of an external vehicle based on a vehicle 511.

For example, the left front of the vehicle 511 may include quadrant I of a two-dimensional (2D) virtual coordinate system formed based on the vehicle 511. For example, the right front of the vehicle 511 may include quadrant IV of a 2D virtual coordinate system formed based on the vehicle 511.

For example, the processor may identify an array of contour points corresponding to a periphery of an external vehicle 521 in the left front of the vehicle 511. For example, the processor may identify a line segment corresponding to the side surface of the external vehicle 521 based on the array of contour points corresponding to the periphery of the external vehicle 521 identified as being in a first shape.

For example, the processor may identify an array of contour points corresponding to a periphery of an external vehicle 523 in the left front of the vehicle 511. For example, the processor may identify a line segment corresponding to the side surface of the external vehicle 523 based on the array of contour points corresponding to the periphery of the external vehicle 523 identified as being in a second shape.

For example, the processor may identify the array of contour points corresponding to the periphery of an external vehicle 531 on the same road as the vehicle 511. For example, the processor may identify a line segment corresponding to the side surface of the external vehicle 531 based on the array of contour points corresponding to the periphery of the external vehicle 531 identified as being in a third shape.

For example, the processor may identify the array of contour points corresponding to the periphery of an external vehicle 533 on the same road as the vehicle 511. For example, the processor may identify a line segment corresponding to the side surface of the external vehicle 533 based on the array of contour points corresponding to the periphery of the external vehicle 533 identified as being in a second shape.

For example, the processor may identify the array of contour points corresponding to the periphery of an external vehicle 541 in the right front of the vehicle 511. For example, the processor may identify a line segment corresponding to the side surface of the external vehicle 541 based on the array of contour points corresponding to the periphery of the external vehicle 541 identified as being in a fourth shape.

For example, the processor may identify the array of contour points corresponding to the periphery of an external vehicle 543 in the right front of the vehicle 511. For example, the processor may identify a line segment corresponding to the side surface of the external vehicle 543 based on the array of contour points corresponding to the periphery of the external vehicle 543 identified as being in a third shape.

In an embodiment, the processor may identify representative points representing a side surface of an external vehicle (e.g., the external vehicle 521, the external vehicle 523, the external vehicle 531, the external vehicle 533, the external vehicle 541, and/or the external vehicle 543).

The identifying of the representative points representing the side surface of the external vehicle will be described later in FIG. 6.

Figure 6:
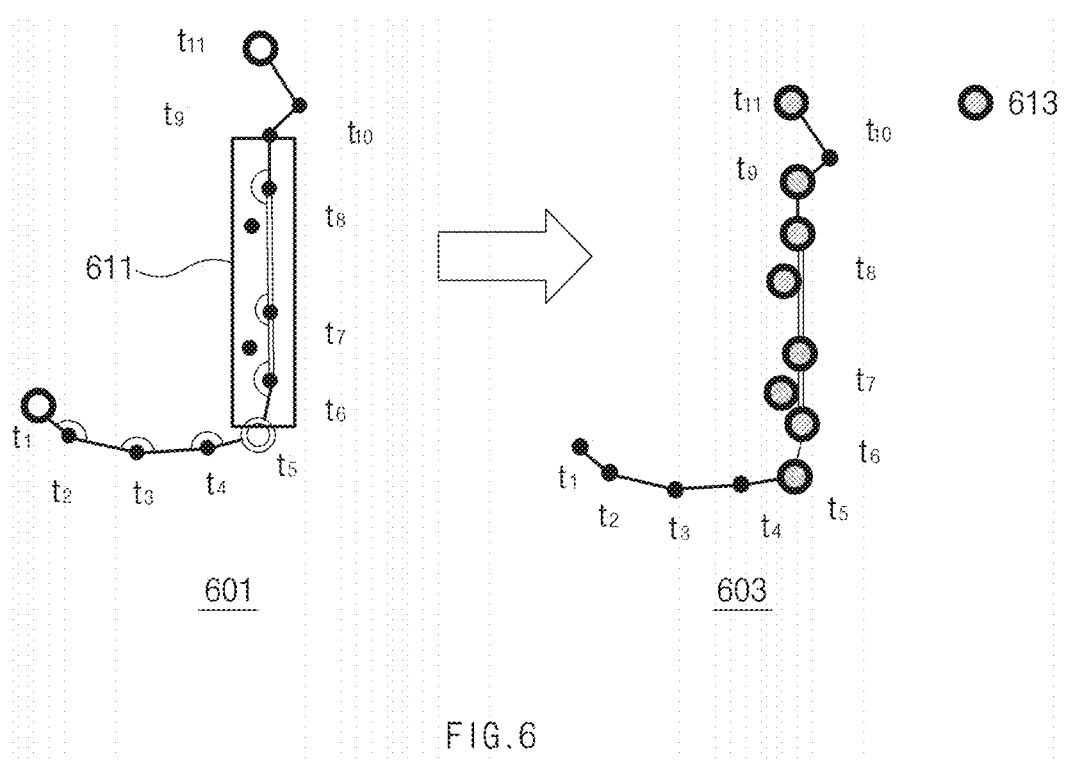
FIG. 6 is a diagram showing an example of identifying representative points representing a side surface of an external vehicle, according to an embodiment of the present disclosure.

FIG. 6 shows an example of identifying representative points representing a side surface of an external vehicle, in an embodiment of the present disclosure.

Referring to FIG. 6, a processor (e.g., the processor 110 in FIG. 1) included in a vehicle control apparatus (e.g., the vehicle control apparatus 100 in FIG. 1) according to an embodiment may identify contour points representing a periphery of an external vehicle from a point cloud.

Referring to a first example 601, in an embodiment, the processor may identify a peak point (e.g., $t_3$) located farthest from a line segment connecting a first end point (e.g., $t_1$) and a second end point (e.g., $t_{11}$). The processor may identify points 611 located within the line segment connecting the second end point and the peak point. For example, the points 611 may be referred to as representative points representing a side surface of an external vehicle. The points 611 located within the line segment connecting the second end point and the peak point may include points identified in an area different from an area between a line segment corresponding to the side surface of a bounding box and/or a virtual box formed by the point cloud, and the line segment connecting the second end point and the peak point.

Referring to a second example 603, in an embodiment, the processor may identify a layer, which includes the longest reference line segment indicating that the reference line segment indicating straightness is longest, from among a plurality of layers formed in z-axis direction. For example, the reference line segment may be identified based on performing a convex hull algorithm.

In an embodiment, the processor may identify points spaced from the longest reference line segment within a reference distance (e.g., about 0.25 m). The processor may determine the points, which are spaced from the longest reference line segment within the reference distance, as representative points representing the side surface of the external vehicle.

Based on performing the above-described operations, the processor may obtain representative points 613 of the second example 603.

Figure 7:
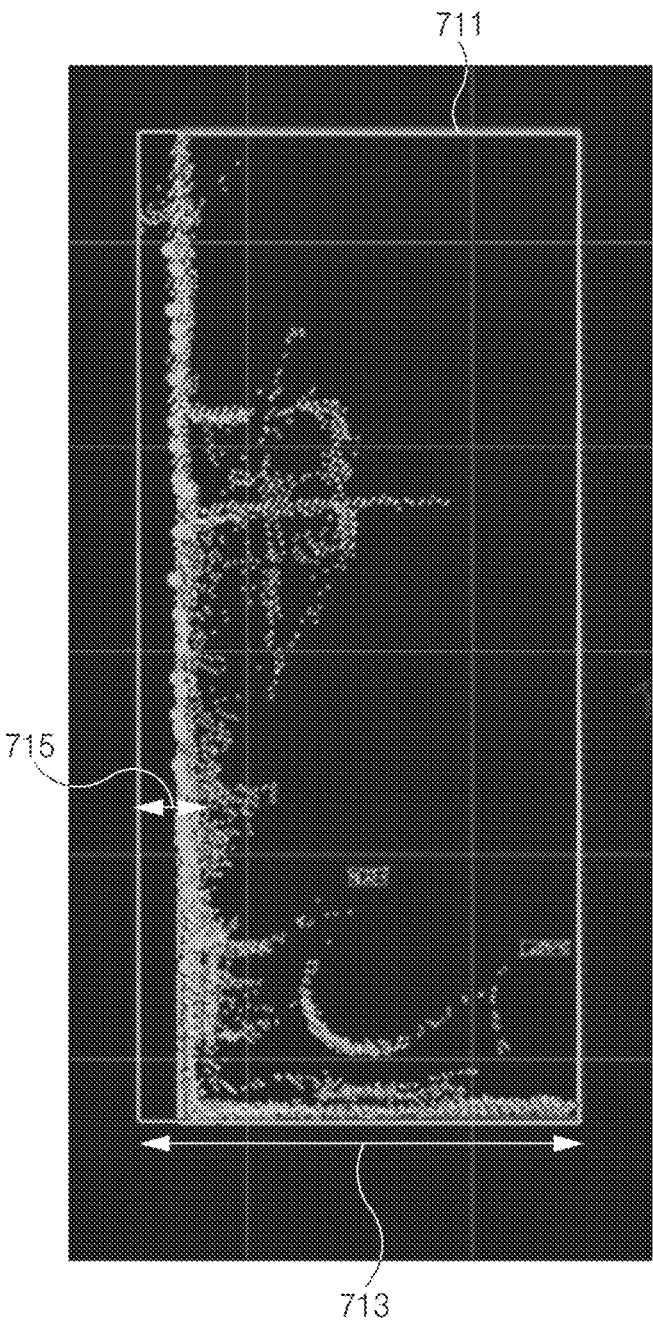
FIG. 7 is a diagram showing an example of determining whether to generate a final bounding box based on a lateral location of a bounding box, in an embodiment of the present disclosure.

FIG. 7 shows an example of determining whether to generate a final bounding box based on a lateral location of a bounding box, in an embodiment of the present disclosure.

Referring to FIG. 7, a processor (e.g., the processor 110 in FIG. 1) of a vehicle control apparatus (e.g., the vehicle control apparatus 100 in FIG. 1) according to an embodiment may obtain an average lateral axis value of representative points. For example, the average lateral axis value of representative points may include an average of y-coordinates of representative points.

In an embodiment, the processor may identify a distance 715 between the average lateral axis value of the representative points and a line segment of a bounding box 711 corresponding to a side surface of an external vehicle. For example, the distance 715 between the average lateral axis value of the representative points and the line segment of the bounding box 711 corresponding to the side surface of the external vehicle may be referred to as a "lateral location correction value".

In an embodiment, if the lateral location correction value is identified between 0 and a reference value, the processor may use the bounding box 711 as the final bounding box. For example, the reference value may be half the width 713 of the bounding box 711.

In an embodiment, if the lateral location correction value is not identified between 0 and the reference value, the processor may obtain the final bounding box by additionally correcting the bounding box 711.

Figure 8:
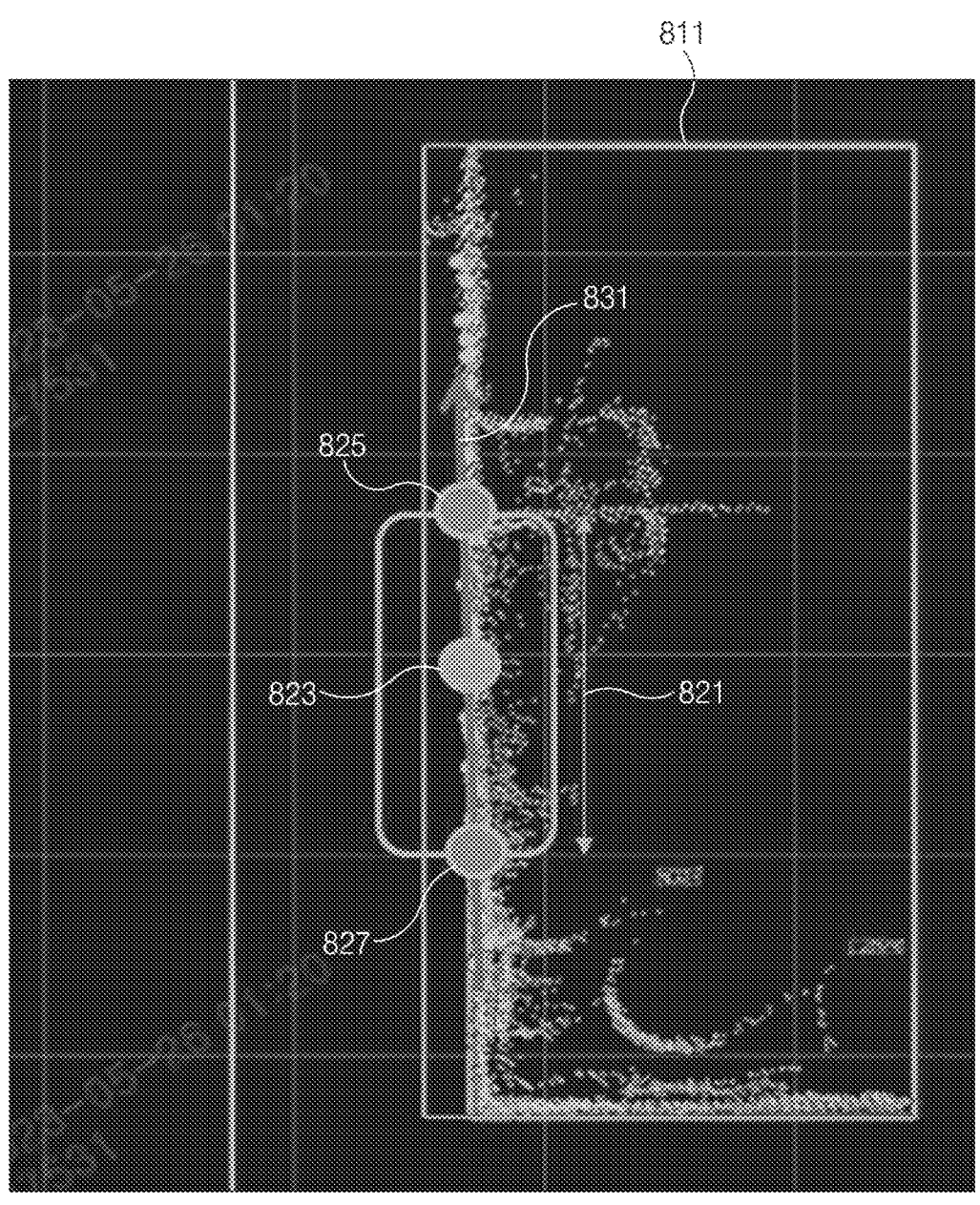
FIG. 8 is a diagram showing an example of identifying a heading direction based on representative points, according to an embodiment of the present disclosure.

FIG. 8 shows an example of identifying a heading direction based on representative points, in an embodiment of the present disclosure.

Referring to FIG. 8, a processor (e.g., the processor 110 in FIG. 1) of a vehicle control apparatus (e.g., the vehicle control apparatus 100 in FIG. 1) according to an embodiment may obtain a bounding box 811 corresponding to an external vehicle. The processor may select an intermediate area 821 among representative points corresponding to a side surface of the external vehicle as a high reliability section.

For example, the intermediate area 821 may include an area within a specific distance from an intermediate representative point 823 among the representative points. For example, the specific distance may be determined depending on a length of the external vehicle.

In an embodiment, the processor may identify a first representative point 825, which is closest to a front surface of the external vehicle, from among representative points included in the intermediate area 821. The processor may identify a second representative point 827, which is closest to a rear surface of the external vehicle, from among the representative points included in the intermediate area 821.

The processor may identify a half-line from the second representative point 827 toward the first representative point 825. The processor may obtain a correction heading direction 831 of the bounding box 811 based on the half-line from the second representative point 827 toward the first representative point 825.

In an embodiment, the processor may identify an angle difference between the correction heading direction 831 of the bounding box 811 and the heading direction of the bounding box 811. The processor may correct the bounding box 811 based on the angle difference between the correction heading direction 831 of the bounding box 811 and the heading direction of the bounding box 811 exceeding a threshold angle. For example, the processor may obtain a final bounding box obtained by correcting the bounding box 811.

In an embodiment, the processor may use the bounding box 811 as the final bounding box based on the angle difference between the correction heading direction 831 of the bounding box 811 and the heading direction of the bounding box 811 being smaller than or equal to the threshold angle.

Figure 9:
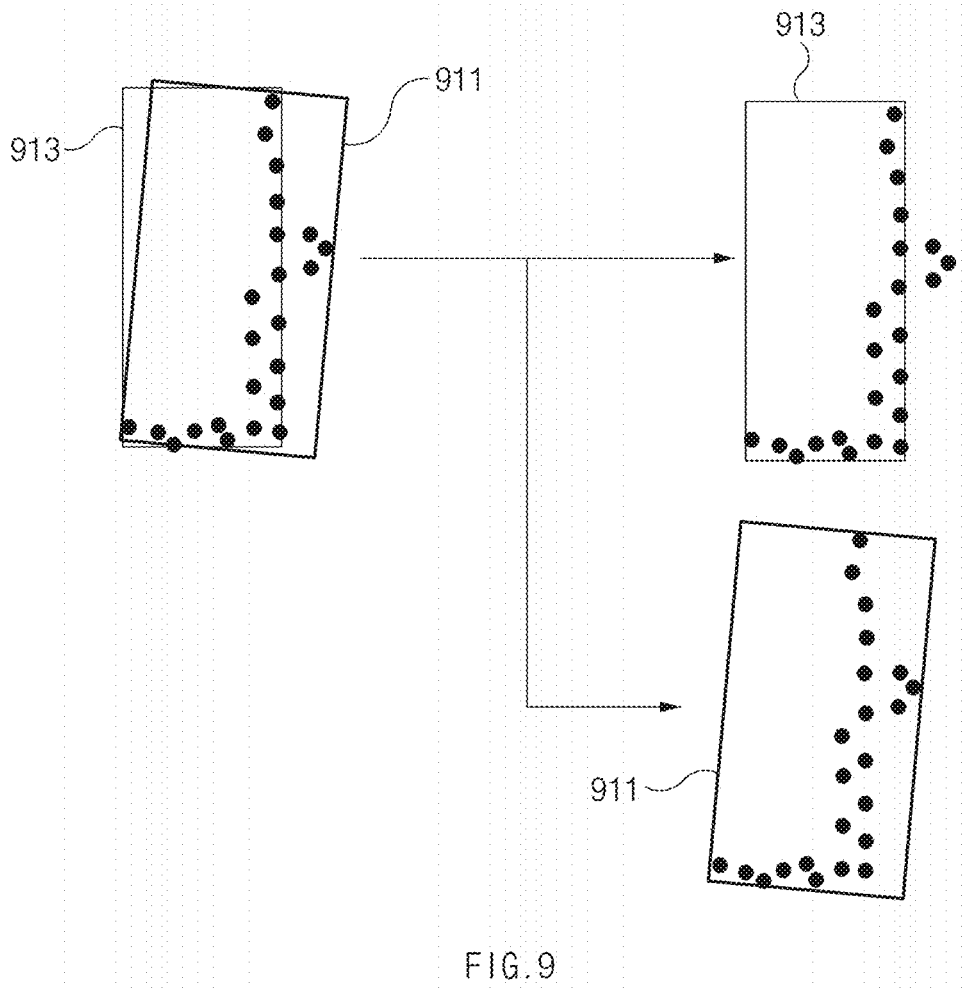
FIG. 9 is a diagram showing an example of using a virtual box and a bounding box, according to an embodiment of the present disclosure.

FIG. 9 shows an example of using a virtual box and a bounding box, in an embodiment of the present disclosure.

Referring to FIG. 9, a processor (e.g., the processor 110 in FIG. 1) of a vehicle control apparatus (e.g., the vehicle control apparatus 100 in FIG. 1) according to an embodiment may generate a virtual box 911 based on a point cloud corresponding to an external vehicle. The processor may generate a bounding box 913 based on removing at least part of the point cloud. For example, the bounding box 913 may include a final bounding box.

In an embodiment, the processor may assign a first identifier to the virtual box 911 generated by the point cloud.

In an embodiment, the processor may assign, to the bounding box 913, a second identifier indicating that the bounding box 913 is generated by the virtual box 911 to which the first identifier is assigned.

In an embodiment, the processor may identify the type of the external vehicle based on the virtual box 911 to which the first identifier is assigned. For example, the processor may identify the type of the external vehicle based on the size of the virtual box 911 to which the first identifier is assigned.

In an embodiment, the processor may track a driving route of the external vehicle based on the bounding box 913 to which the second identifier is assigned. For example, the processor may identify a rear surface center point of the bounding box 913, to which the second identifier is assigned, and which corresponds to the rear surface center of the external vehicle, from the bounding box 913 to which the second identifier is assigned. The processor may track the external vehicle based on a location of the rear surface center point.

As described above, the processor of the vehicle control apparatus according to an embodiment may accurately identify the type of the external vehicle by identifying the type of the external vehicle by using the virtual box 911 generated by using all the points included in the point cloud. Moreover, the processor may track the external vehicle by using the bounding box 913 generated by using a part of the point cloud from which points of a portion corresponding to the side mirror are removed, thereby accurately identifying the location of the external vehicle and/or the driving direction of the external vehicle.

FIG. 10 shows an example of a flowchart associated with a vehicle control method, according to an embodiment of the present disclosure.

Hereinafter, it can be assumed that the vehicle control apparatus 100 of FIG. 1 performs the process of FIG. 10, for example. In addition, in a description of FIG. 10, an operation described as being performed by a processor can be controlled by the processor 110 of the vehicle control apparatus 100, for example.

At least one of operations of FIG. 10 may be performed by the vehicle control apparatus 100 of FIG. 1. Each of the operations in FIG. 10 may be performed sequentially, but is not necessarily sequentially performed. For example, the order of operations may be changed, and at least two operations may be performed in parallel.

Referring to FIG. 10, in operation S1001, a vehicle control method according to an embodiment may include an operation of obtaining a plurality of points by removing points with a specific height or higher from a point cloud based on obtaining the point cloud corresponding to an external vehicle through a LiDAR (e.g., the LiDAR 120 in FIG. 1).

The vehicle control method according to an embodiment may include an operation of removing the points with the specific height or higher from the point cloud corresponding to the external vehicle based on a distance between a vehicle and the external vehicle being smaller than or equal to a second reference distance different from the first reference distance described later.

The vehicle control method according to an embodiment may include an operation of identifying a length of the point cloud in a direction of a first axis among the first axis, a second axis, and a third axis and removing first points, which are identified at the first specific height or higher in the third axis direction, based on the length of the point cloud being within a first range.

The vehicle control method according to an embodiment may include an operation of removing second points, which are identified at the second specific height or higher in a direction of the third axis, based on the length of the point cloud being within a second range greater than the first range.

In operation S1003, the vehicle control method according to an embodiment may include an operation of generating a bounding box based on contour points indicating the periphery of the external vehicle among the plurality of points.

The vehicle control method according to an embodiment may include an operation of identifying the contour points on each of a plurality of layers formed in a direction of a third axis among a first axis, a second axis, and the third axis, and generating the bounding box including the contour points identified on each of the plurality of layers.

In operation S1005, the vehicle control method according to an embodiment may include an operation of obtaining a final bounding box by correcting the bounding box based on the angle between the first heading direction of the virtual box by the point cloud and the second heading direction of the bounding box exceeding the reference angle, and the distance between the first location of the virtual box corresponding to the center of the rear surface of the external vehicle and the second location of the bounding box corresponding to the center of the rear surface of the external vehicle being smaller than or equal to the first reference distance.

The vehicle control method according to an embodiment may include an operation of identifying an array of the contour points based on a location at which the point cloud is identified, and identifying a first line segment of the bounding box corresponding to a side surface of the external vehicle based on the location, at which the point cloud is identified, and the array of contour points.

The vehicle control method according to an embodiment may include an operation of identifying a first end point and a second end point, which are not coupled with other contour points, from among the contour points, identifying a peak point located farthest from a line segment connecting the first end point and the second end point, identifying a second line segment connecting the peak point and an end point corresponding to the side surface of the external vehicle, from among the first end point and the second end point, and identifying representative points corresponding to the side surface of the external vehicle in an area different from an area between the first line segment and the second line segment.

According to an embodiment, the vehicle control method may further include obtaining a lateral location correction value of the bounding box based on a distance between the first line segment and an average of coordinate values of the representative points in a direction of a second axis among a first axis, the second axis, and a third axis, and obtaining the final bounding box obtained by correcting the bounding box based on a difference between the lateral location correction value and a reference value being smaller than a threshold value.

The vehicle control method according to an embodiment may include an operation of identifying an intermediate representative point among the representative points, identifying a first representative point and a second representative point, which are included within a specific distance from the intermediate representative point and which are farthest spaced from the intermediate representative point, from among the representative points, identifying the second heading direction based on the first representative point and the second representative point, and obtaining the final bounding box based on a difference between the first heading direction and the second heading direction exceeding the reference angle.

The vehicle control method according to an embodiment may include an operation of assigning a first identifier to the virtual box by the point cloud, and assigning, to the final bounding box, a second identifier indicating that the final bounding box is generated by the virtual box to which the first identifier is assigned.

The vehicle control method according to an embodiment may include an operation of identifying a type of the external vehicle based on the virtual box to which the first identifier is assigned, and tracking a driving route of the external vehicle based on the final bounding box to which the second identifier is assigned.

As described above, the vehicle control method according to an embodiment may assist in an operation of the vehicle including the vehicle control apparatus based on the final bounding box and the virtual box obtained from the point cloud corresponding to the external vehicle.

Figure 11:
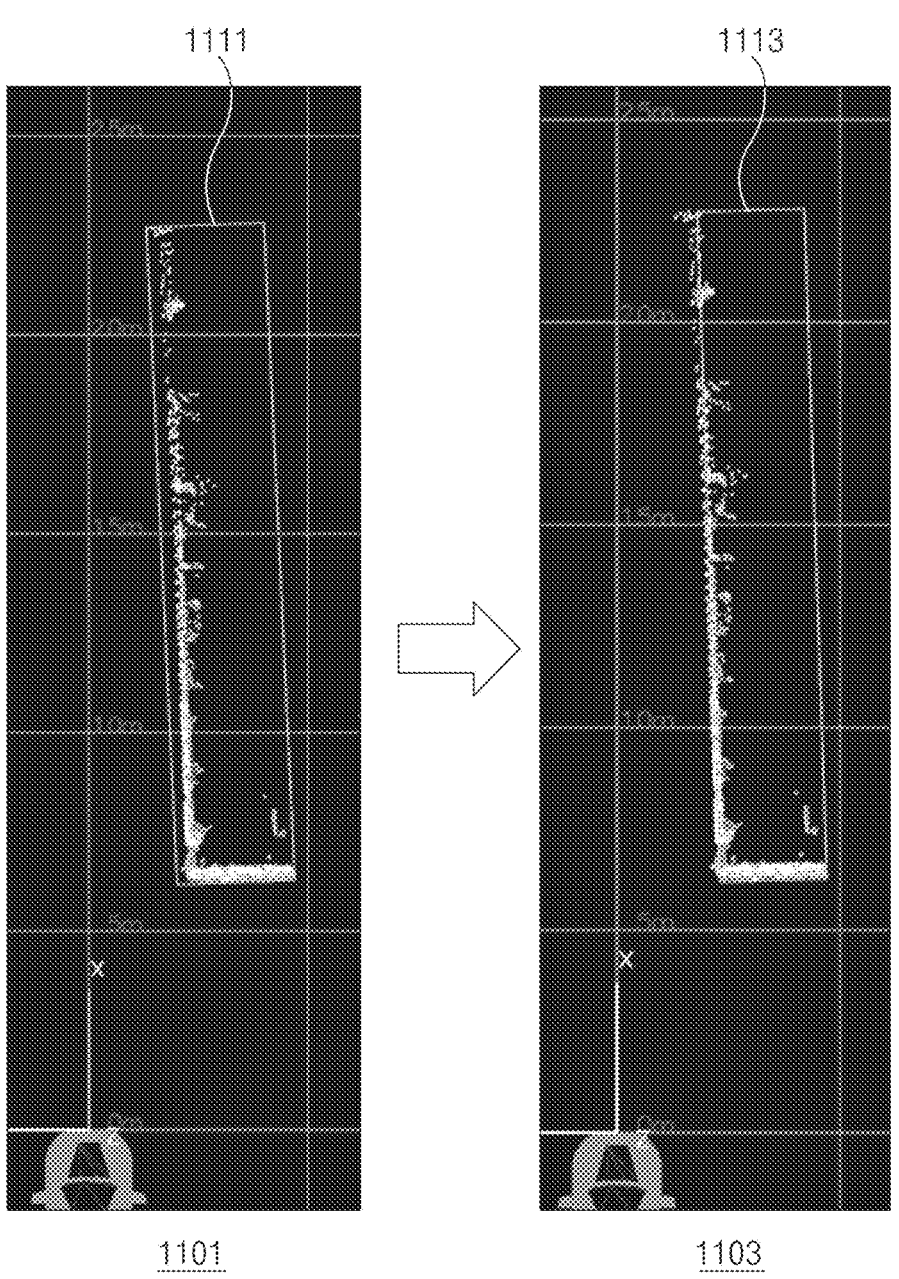
FIG. 11 is a diagram showing an example of a result of applying an embodiment of the present disclosure.

FIG. 11 shows an example of a result of applying an embodiment of the present disclosure.

Referring to FIG. 11, a virtual box 1111 in a first example 1101 may include an example in which points corresponding to a side mirror of an external vehicle are output without being removed.

A bounding box 1113 in a second example 1103 may include an example in which points corresponding to the side mirror of the external vehicle are output with the points removed.

As illustrated in the second example 1103, the driving direction of the external vehicle may be relatively accurately identified by outputting the bounding box 1113 based on removing the points corresponding to the side mirror.

A vehicle control apparatus and/or a vehicle control method according to an embodiment of the present disclosure may identify the driving direction of the external vehicle relatively accurately, thereby assisting in stably operating a vehicle including the vehicle control apparatus and/or the vehicle to which the vehicle control method is applied.

Figure 12:
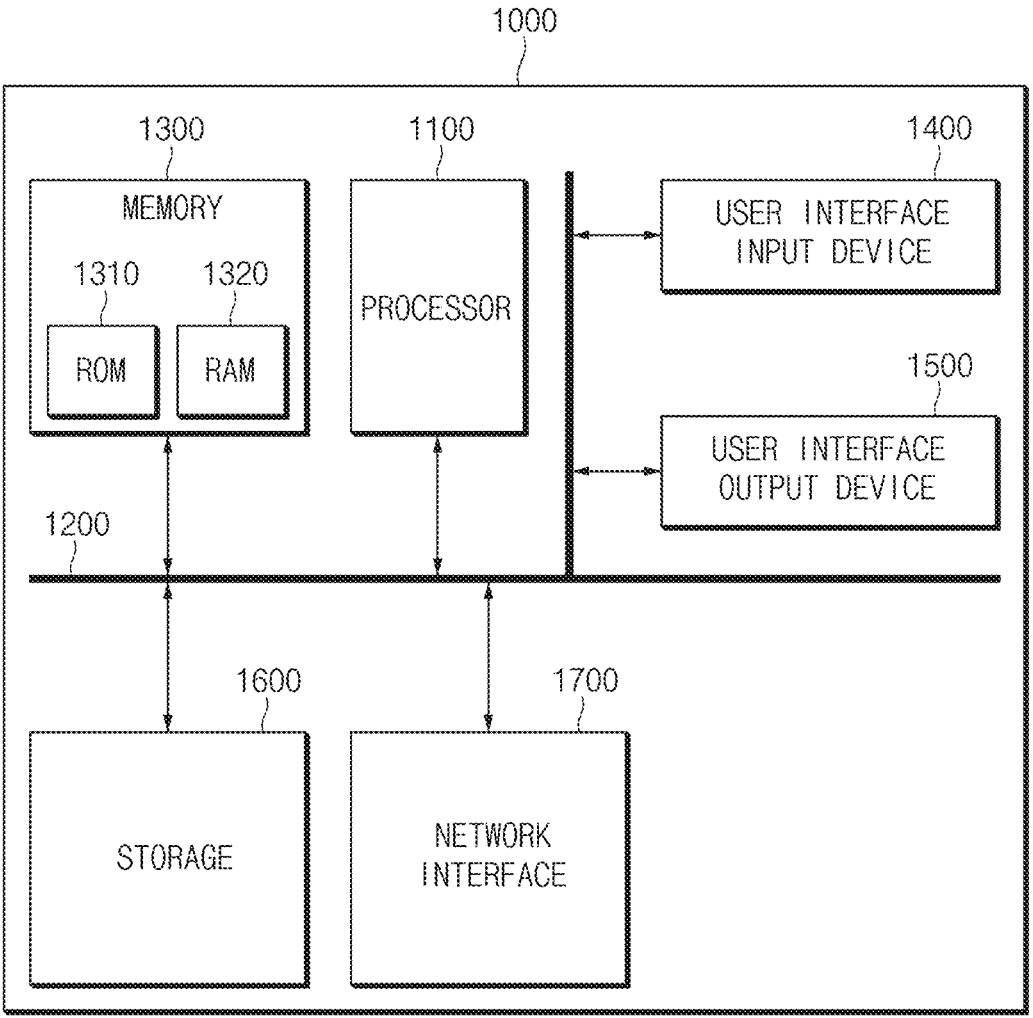
FIG. 12 is a diagram showing a computing system associated with a vehicle control apparatus or vehicle control method, according to an embodiment of the present disclosure.

FIG. 12 illustrates a computing system associated with a vehicle control apparatus or vehicle control method, according to an embodiment of the present disclosure.

Referring to FIG. 12, a computing system 1000 may include at least one processor 1100, a memory 1300, a user interface input device 1400, a user interface output device 1500, storage 1600, and a network interface 1700, which are connected with each other via a bus 1200, and any combination of or all of which may be in plural or may include plural components thereof.

The processor 1101 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM, for example. The exemplary storage medium can be coupled to the processor 1100, and the processor 1100 may read information from the storage medium and may write information in the storage medium. In another method, the storage medium may be integrated with the processor 1101. The processor 1100 and the storage medium may reside in an application specific integrated circuit (ASIC). The ASIC may reside in a user terminal. In another method, the processor 1100 and the storage medium may reside in the user terminal as an individual component.

Hereinabove, although the present disclosure has been described with reference to some example embodiments and the accompanying drawings, the present disclosure is not necessarily limited thereto, but may be variously modified and altered by those skilled in the art to which the present disclosure pertains without departing from the spirit and scope of the present disclosure according to the following claims.

Therefore, the example embodiments of the present disclosure are provided to explain the spirit and scope of the present disclosure, but not to necessarily limit them, so that the spirit and scope of the present disclosure is not necessarily limited by the example embodiments. The scope of the present disclosure can be construed based on the accompanying claims, and technical ideas within the scope(s) equivalent to the claims can be included in the scope of the present disclosure.

Some embodiments may generate a bounding box obtained by excluding a portion corresponding to a side mirror of an external vehicle.

Moreover, some embodiments may accurately identify a heading direction of the external vehicle by generating the bounding box obtained by excluding the portion corresponding to the side mirror of the external vehicle.

Furthermore, some embodiments may accurately identify the type of the external vehicle by identifying the type of the external vehicle by using information including the side mirror even though the bounding box obtained by excluding the portion corresponding to the side mirror of the external vehicle is generated.

A variety of advantages can be directly or indirectly understood from the present disclosure.

What is claimed is:

1. A vehicle control apparatus for a first vehicle comprising:
a light detection and ranging device (LiDAR);
a processor; and
a memory coupled to the processor and storing instructions that, when executed by the processor cause the processor to:
obtain a plurality of points by removing a first set of points selected from the plurality of points having a selected height or higher from a point cloud from the first set of points based on obtaining the point cloud corresponding to an external vehicle from the LiDAR;
generate a bounding box based on contour points of the plurality of points that indicate a periphery of the external vehicle;
obtain a final bounding box correcting the bounding box based on an angle between a first heading direction of a virtual box defined by the point cloud and a second heading direction of the bounding box exceeding a reference angle, and based on a travel distance between a first location of the virtual box corresponding to a center of a rear surface of the external vehicle and a second location of the bounding box corresponding to the center of the rear surface of the external vehicle being smaller than or equal to a first reference distance; and
control operation of the vehicle control apparatus based on a location and a driving direction of the external vehicle tracked using the final bounding box.

2. The apparatus of claim 1, wherein the instructions further cause the processor to remove the first set of the points from the point cloud based on a vehicle distance between the first vehicle and the external vehicle being smaller than or equal to a second reference distance.

3. The apparatus of claim 1, wherein the selected height includes a first selected height and a second selected height exceeding the first selected height, and
wherein the instructions further cause the processor to:
identify a length of the point cloud in a first direction of a first axis among the first axis, a second axis, and a third axis;
remove a first subset of the points identified at the first selected height or higher in a third direction of the third axis, based on the length of the point cloud being within a first range; and
remove a second subset of the points identified at the second selected height or higher in the third direction of the third axis, based on the length of the point cloud being within a second range greater than the first range.

4. The apparatus of claim 1, wherein the instructions further cause the processor to:
identify the contour points on each of a plurality of layers formed in a third direction of a third axis among a first axis, a second axis, and the third axis; and
generate the bounding box including the contour points identified on each of the layers.

5. The apparatus of claim 1, wherein the instructions further cause the processor to:
identify an array of the contour points based on a location at which the point cloud is identified; and identify a first line segment of the bounding box corresponding to a side surface of the external vehicle based on the location and the array of the contour points.

6. The apparatus of claim 5, wherein the instructions further cause the processor to:
identify a first end point and a second end point from among the contour points, wherein each of the first end point and the second end point is not coupled with other of the contour points;
identify a peak point located farthest from a line segment connecting the first end point and the second end point;
identify a second line segment connecting the peak point with the first end point or the second end point, wherein the second line segment is included in a contour subset of the contour points corresponding to the side surface of the external vehicle; and
identify representative points corresponding to the side surface of the external vehicle in a first area different from a second area between the first line segment and the second line segment.

7. The apparatus of claim 6, wherein the instructions further cause the processor to:
obtain a lateral location correction value of the bounding box based on a correction distance between the first line segment and an average of coordinate values of the representative points in a second direction of a second axis among a first axis, the second axis, and a third axis; and
obtain the final bounding box based on a difference between the lateral location correction value and a reference value being smaller than a threshold value.

8. The apparatus of claim 6, wherein the instructions further cause the processor to:
identify an intermediate representative point among the representative points;
identify a first representative point and a second representative point from among the representative points that are included within a selected distance from the intermediate representative point and that are farthest spaced from the intermediate representative point;
identify the second heading direction based on the first representative point and the second representative point; and
obtain the final bounding box based on a difference between the first heading direction and the second heading direction exceeding the reference angle.

9. The apparatus of claim 1, wherein the instructions further cause the processor to:
assign a first identifier to the virtual box; and
assign a second identifier to the final bounding box indicating that the final bounding box is generated by the virtual box to which the first identifier is assigned.

10. The apparatus of claim 9, wherein the instructions further cause the processor to:
identify a type of the external vehicle based on the virtual box to which the first identifier is assigned; and
track a driving route of the external vehicle based on the final bounding box to which the second identifier is assigned.

11. A vehicle control method comprises:
obtaining a plurality of points by removing a first set of points selected from the plurality of points having a selected height or higher from a point cloud from the first set of points based on obtaining the point cloud corresponding to an external vehicle from a light detection and ranging device (LiDAR) of a first vehicle;

generating a bounding box based on contour points of the plurality of points that indicate a periphery of the external vehicle;

obtaining a final bounding box obtained by correcting the bounding box based on an angle between a first heading direction of a virtual box defined by the point cloud and a second heading direction of the bounding box exceeding a reference angle, and based on a travel distance between a first location of the virtual box corresponding to a center of a rear surface of the external vehicle and a second location of the bounding box corresponding to the center of the rear surface of the external vehicle being smaller than or equal to a first reference distance; and controlling operation of the first vehicle based on a location and a driving direction of the external vehicle tracked using the final bounding box.

12. The method of claim 11, further comprising removing the first set of the points from the point cloud based on a vehicle distance between the first vehicle and the external vehicle being smaller than or equal to a second reference distance.

13. The method of claim 11, further comprising:

identifying the contour points on each of a plurality of layers formed in a third direction of a third axis among a first axis, a second axis, and the third axis; and generating the bounding box including the contour points identified on each of the plurality of layers.

14. The method of claim 11, further comprising:

identifying an array of the contour points based on a location at which the point cloud is identified; and identifying a first line segment of the bounding box corresponding to a side surface of the external vehicle based on the location and the array of the contour points.

15. The method of claim 14, further comprising:

identifying a first end point and a second end point from among the contour points, wherein each of the first end point and the second end point is not coupled with other of the contour points;

identifying a peak point located farthest from a line segment connecting the first end point and the second end point;

identifying a second line segment connecting the peak point with the first end point or the second end point, wherein the second line segment is included in a contour subset of the contour points corresponding to the side surface of the external vehicle; and identifying representative points corresponding to the side surface of the external vehicle in a first area different from a second area between the first line segment and the second line segment.

16. The method of claim 15, further comprising:

obtaining a lateral location correction value of the bounding box based on a correction distance between the first line segment and an average of coordinate values of the representative points in a second direction of a second axis among a first axis, the second axis, and a third axis; and obtaining the final bounding box based on a difference between the lateral location correction value and a reference value being smaller than a threshold value.

17. The method of claim 15, further comprising:

identifying an intermediate representative point among the representative points;

identifying a first representative point and a second representative point from among the representative points that are included within a selected distance from the intermediate representative point and that are farthest spaced from the intermediate representative point;

identifying the second heading direction based on the first representative point and the second representative point; and obtaining the final bounding box based on a difference between the first heading direction and the second heading direction exceeding the reference angle.

18. The method of claim 11, further comprising:

assigning a first identifier to the virtual box; and assigning a second identifier to the final bounding box indicating that the final bounding box is generated by the virtual box to which the first identifier is assigned.

19. The method of claim 18, further comprising:

identifying a type of the external vehicle based on the virtual box to which the first identifier is assigned; and tracking a driving route of the external vehicle based on the final bounding box to which the second identifier is assigned.

20. A vehicle control method comprises:

obtaining a plurality of points by removing a first set of points selected from the plurality of points having a selected height or higher from a point cloud from the first set of points based on obtaining the point cloud corresponding to an external vehicle from a light detection and ranging device (LiDAR) of a first vehicle;

generating a bounding box based on contour points of the plurality of points that indicate a periphery of the external vehicle;

obtaining a final bounding box obtained by correcting the bounding box based on an angle between a first heading direction of a virtual box defined by the point cloud and a second heading direction of the bounding box exceeding a reference angle, and based on a travel distance between a first location of the virtual box corresponding to a center of a rear surface of the external vehicle and a second location of the bounding box corresponding to the center of the rear surface of the external vehicle being smaller than or equal to a first reference distance; and controlling operation of the first vehicle based on a location and a driving direction of the external vehicle tracked using the final bounding box;

wherein the selected height includes a first selected height and a second selected height exceeding the first selected height, and the method further comprises:

identifying a length of the point cloud in a first direction of a first axis among the first axis, a second axis, and a third axis;

removing a first subset of the points identified at the first selected height or higher in a third direction of the third axis, based on the length of the point cloud being within a first range; and removing a second subset of the points identified at the second selected height or higher in the third direction of the third axis, based on the length of the point cloud being within a second range greater than the first range.

* * * * *